United States Patent
Ye

(10) Patent No.: US 10,674,543 B2
(45) Date of Patent: Jun. 2, 2020

(54) DEVICE AND METHOD OF HANDLING RANDOM ACCESS PROCEDURE

(71) Applicant: HTC Corporation, Taoyuan (TW)

(72) Inventor: Shiang-Rung Ye, Taoyuan (TW)

(73) Assignee: HTC Corporation, Taoyuan (TW)

( * ) Notice: Subject to any disclaimer, the term of this patent is extended or adjusted under 35 U.S.C. 154(b) by 3 days.

(21) Appl. No.: 16/049,773

(22) Filed: Jul. 30, 2018

(65) Prior Publication Data

US 2019/0053283 A1 Feb. 14, 2019

Related U.S. Application Data

(60) Provisional application No. 62/543,915, filed on Aug. 10, 2017.

(51) Int. Cl.
| | |
|---|---|
| *H04W 74/08* | (2009.01) |
| *H04W 72/08* | (2009.01) |
| *H04W 56/00* | (2009.01) |
| *H04W 76/27* | (2018.01) |
| *H04L 12/24* | (2006.01) |

(52) U.S. Cl.
CPC ..... *H04W 74/0833* (2013.01); *H04L 41/0668* (2013.01); *H04W 56/00* (2013.01); *H04W 56/001* (2013.01); *H04W 72/085* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 2015/0181624 A1 | 6/2015 | Hwang | |
| 2016/0262047 A1 | 9/2016 | Yi | |
| 2017/0141833 A1 | 5/2017 | Kim | |
| 2017/0332288 A1* | 11/2017 | Sadek | H04L 1/1887 |
| 2019/0037605 A1* | 1/2019 | Agiwal | H04W 74/0833 |

FOREIGN PATENT DOCUMENTS

| | | |
|---|---|---|
| WO | 2016/068072 A1 | 5/2016 |
| WO | 2016/210302 A1 | 12/2016 |

OTHER PUBLICATIONS

Intel Corporation, "SS block identifier reporting", 3GPP TSG RAN WG2 Meeting #98, R2-1704766, Hangzhou, China, May 15-19, 2017, pp. 1-3.

(Continued)

*Primary Examiner* — Scott M Sciacca
(74) *Attorney, Agent, or Firm* — Winston Hsu

(57) ABSTRACT

A communication device of performing a random access (RA) procedure comprises instructions of: receiving a first configuration of a first synchronization signal (SS) block of a base station (BS) and a second configuration of a second SS block of the BS; obtaining a first result indicating that a first signal quality of the first SS block is higher than a second signal quality of the second SS block; selecting the first configuration according to the first result; obtaining a second result indicating that the first signal quality is lower than the second signal quality, when the communication device fails to receive at least one message from the BS; and selecting the second configuration according to the second result.

16 Claims, 3 Drawing Sheets

(56) References Cited

OTHER PUBLICATIONS

Office action dated May 13, 2019 for the Taiwan application No. 107126786, filing date Aug. 2, 2018, pp. 1-17.
Search Report dated Jan. 2, 2019 for EP application No. 18187570.9, pp. 1-6.
Samsung, "NR 4-step random access procedure", 3GPP TSG RAN WG1 NR Ad Hoc, R1-1700891, Jan. 16-20, 2017, Spokane, Washington, USA, XP051208407, pp. 1-14.
Ericsson, "NR four-step random access procedure", 3GPP TSG-RAN WG1 Meeting #88, R1-1702128, Feb. 13-17, 2017, Athens, Greece, XP051209288, pp. 1-7.
3GPP TS 38.321 V2.0.0 Dec. 2017.

\* cited by examiner

DEVICE AND METHOD OF HANDLING RANDOM ACCESS PROCEDURE

CROSS REFERENCE TO RELATED APPLICATIONS

This application claims the benefit of U.S. Provisional Application No. 62/543,915 filed on Aug. 10, 2017, which is incorporated herein by reference.

BACKGROUND OF THE INVENTION

1. Field of the Invention

The present invention relates to a communication device and a method used in a wireless communication system, and more particularly, to a communication device and a method of handling a random access procedure.

2. Description of the Prior Art

A user equipment (UE) may receive a plurality of beams from a base station (BS), and may perform a random access (RA) procedure with the BS via one of the plurality of beams. However, it is unknown how (or when) the UE selects the one of the plurality of beams, when the UE performs the RA procedure. Thus, how to handle the RA procedure is an important problem to be solved.

SUMMARY OF THE INVENTION

The present invention therefore provides a method and related communication device for handling a random access procedure to solve the abovementioned problem.

A communication device of performing a random access (RA) procedure, comprises at least one storage device and at least one processing circuit, coupled to the at least one storage device, wherein the at least one storage device stores, and the at least one processing circuit is configured to execute instructions of: receiving a first configuration of a first synchronization signal (SS) block of a base station (BS) and a second configuration of a second SS block of the BS; obtaining a first result indicating that a first signal quality of the first SS block is higher than a second signal quality of the second SS block; selecting the first configuration according to the first result; obtaining a second result indicating that the first signal quality is lower than the second signal quality, when the communication device fails to receive at least one message from the BS; and selecting the second configuration according to the second result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
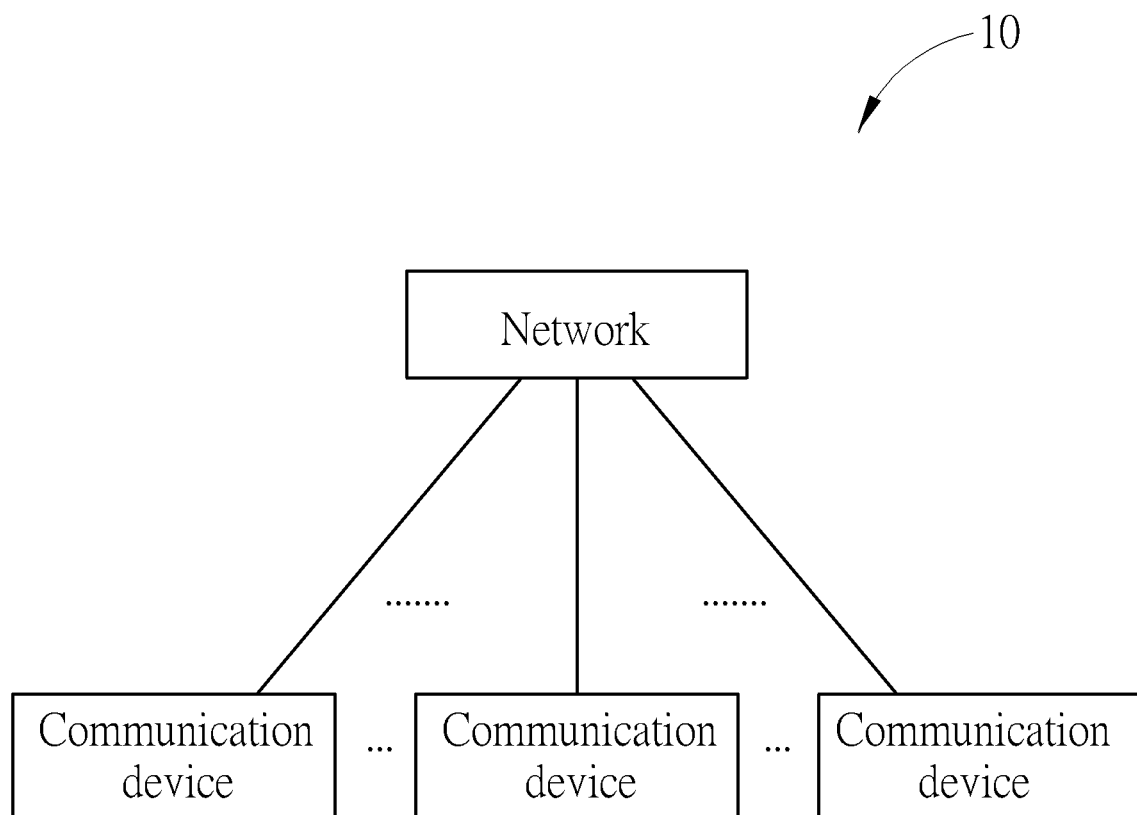
FIG. 1 is a schematic diagram of a wireless communication system according to an example of the present invention.

In FIG. 1, the wireless communication system 10 is briefly composed of a network and a plurality of communication devices. The network and the communication device may (e.g., simultaneously) communicate with each other via one or multiple cells including a primary cell (PCell) and one or more secondary cells (SCells).

Practically, the network in FIG. 1 may comprise a narrowband internet of things (NB-IoT) network or an evolved universal terrestrial radio access network (E-UTRAN) including at least one evolved Node-B (eNB). The network may comprise a new radio (NR)/next generation (NextGen) network including at least one 5G base station (BS) (or called gNB) or an evolved gNB (egNB) or a sixth generation (6G) BS. The 5G/6G radio communication technology may employ orthogonal frequency-division multiplexing (OFDM) and/or non-OFDM. In general, a BS may also be used to refer any of the eNB, the gNB, the egNB and the 6G BS.

A communication device may be a user equipment (UE), a NB-IoT UE, a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for a uplink (UL), the communication device is the transmitter and the network is the receiver, and for a downlink (DL), the network is the transmitter and the communication device is the receiver.

Figure 2:
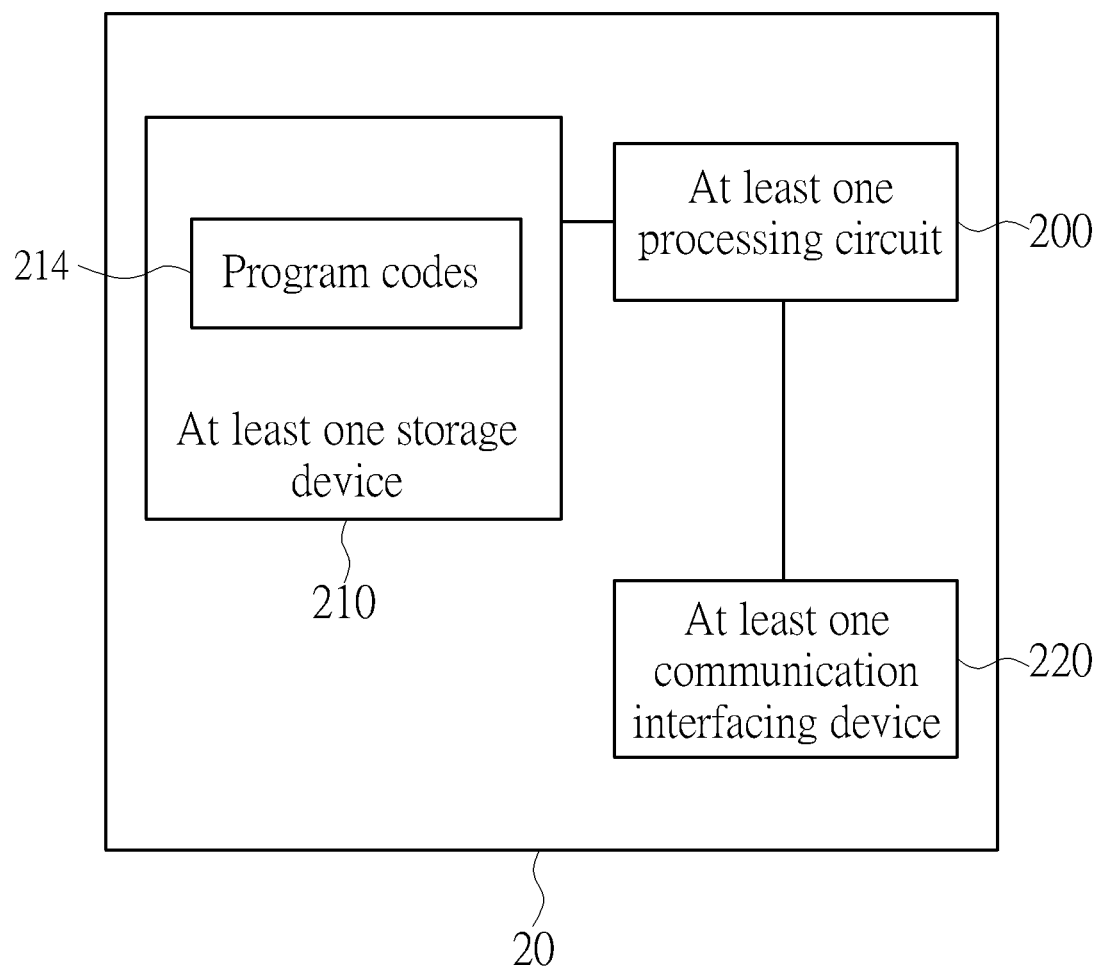
FIG. 2 is a schematic diagram of a communication device according to an example of the present invention.

FIG. 2 is a schematic diagram of a communication device 20 according to an example of the present invention. The communication device 20 may be the communication device shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device in FIG. 1, to simplify the illustration of the embodiments.

Figure 3:
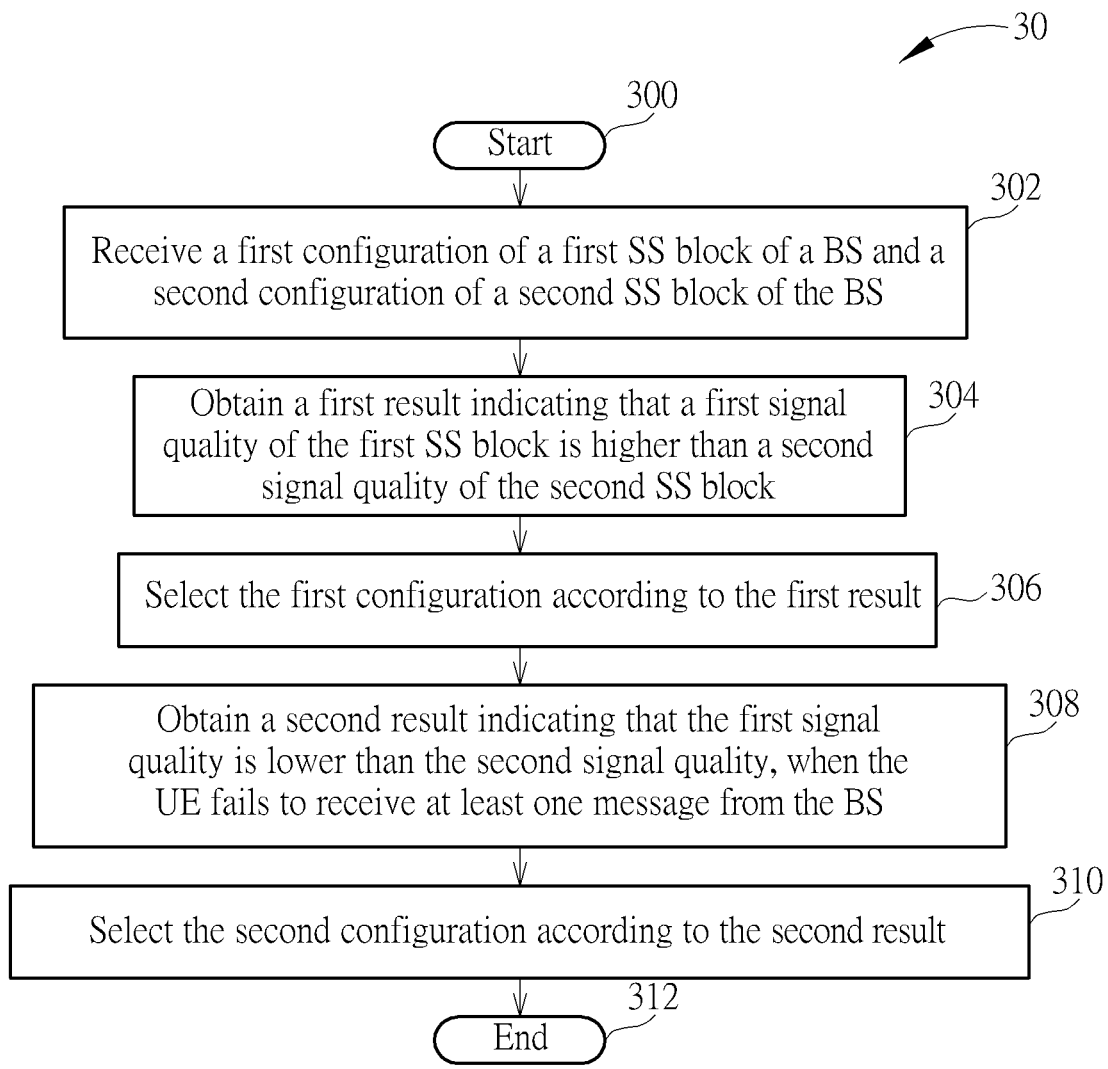
FIG. 3 is a flowchart of a process according to an example of the present invention.

A process 30 in FIG. 3 according to an example of the present invention may be utilized in a UE. The process 30 includes the following steps:

Step 300: Start.

Step 302: Receive a first configuration of a first synchronization signal (SS) block of a BS and a second configuration of a second SS block of the BS.

Step 304: Obtain a first result indicating that a first signal quality of the first SS block is higher than a second signal quality of the second SS block.

Step 306: Select the first configuration according to the first result.

Step 308: Obtain a second result indicating that the first signal quality is lower than the second signal quality, when the UE fails to receive at least one message from the BS.

Step 310: Select the second configuration according to the second result.

Step 312: End.

According to the process 30, the UE receives a first configuration of a first SS block (e.g., related to a first beam) of a BS and a second configuration of a second SS block (e.g., related to a second beam) of the BS. The UE obtains (e.g., determines) a first result indicating that a first signal quality of the first SS block is higher than a second signal quality of the second SS block. The UE selects (e.g., determines to select) the first configuration according to the first result. The UE obtains a second result indicating that the first signal quality is lower than the second signal quality, when (e.g., after) the UE fails to receive at least one message from the BS. The UE selects the second configuration according to the second result. That is, the UE selects the second configuration, when the UE fails to receive the at least one message from the BS.

Realization of the processes 30 is not limited to the above description. The following examples may be applied to the processes 30.

In one example, the UE selects (e.g., randomly) a first RA preamble and a first resource (e.g., time resource and/or frequency resource) from the first configuration. In one example, the UE transmits the first RA preamble to the BS via the first resource.

In one example, the UE transmits the first RA preamble to the BS for a first number of times. That is, the UE transmits the first RA preamble repeatedly. In one example, the UE transmits the first RA preamble to the BS via the first resource or a second resource in each of the first number of times. The second resource may be selected from the first configuration. In one example, the first number of times is the number of a plurality of SS blocks of the BS.

In one example, the UE obtains (e.g., determines) that the UE fails to receive the at least one message from the BS, when (e.g., if) the UE does not receive the at least one message from the BS before/when a first timer expires. In one example, the first timer starts after a first time interval from that (e.g., when) the UE transmits the first RA preamble to the BS (e.g., from a first time of the transmission of the first RA preamble, or from an end of the transmission of the first RA preamble). In one example, the first timer may be a RA response (RAR) timer, and the at least one message may be a RAR message including the first RA preamble.

In one example, the UE transmits a "msg3" message including a UE identity (ID) (e.g., cell radio network temporary identifier, C-RNTI) of the UE to the BS via a third resource specified (e.g., assigned, configured, indicated) in the RAR message, if the UE receives (e.g., successfully) the RAR message before the first timer expires. Then, the UE obtains (e.g., determines) that the UE fails to receive the at least one message from the BS, when (e.g., if) the UE does not receive the at least one message from the BS before/when a second timer expires. In one example, the second timer starts after a second time interval from that (when) the UE transmits the "msg3" message including the UE ID of the UE to the BS (e.g., from an end of the transmission of the "msg3" message). In one example, the second timer may be a contention resolution timer, and the at least one message may be a contention resolution message (e.g., "msg4") including the UE ID of the UE.

In one example, the UE selects (e.g., randomly) a second RA preamble and a fourth resource (e.g., time resource and/or frequency resource) from the second configuration. The UE may transmit the second RA preamble to the BS via the fourth resource. In one example, the UE transmit the second RA preamble to the BS for a second number of times. That is, the UE transmits the second RA preamble repeatedly. In one example, the second number of times is the number of the plurality of SS blocks of the BS.

In one example, the UE selects (e.g., randomly) the second RA preamble and the fourth resource from the second configuration, if the first signal quality and the second signal quality are higher than a threshold and the first signal quality is lower than the second signal quality minus an offset. In one example, the threshold is broadcasted by the BS, when the UE is in a radio resource control (RRC) idle mode (e.g., state), a RRC connected mode or a RRC inactive mode. In one example, the threshold is transmitted by the BS in a RRC message, when the UE is in a RRC connected mode.

In one example, the first signal quality or the second signal quality includes a reference signal receiving power (RSRP) of a demodulation reference signal (DMRS) for a physical broadcast channel (PBCH). In one example, the first signal quality (or the second signal quality) includes a RSRP of a primary synchronization signal (PSS) or a secondary synchronization signal (SSS) in the first SS block (or the second SS block).

The following example is concluded according to the process 30 and related examples. A gNB transmits a first configuration associated with a first SS block of the gNB and a second configuration associated with a second SS block of the gNB to a UE. The UE selects the first configuration, when a first signal quality of the first SS block is higher than a second signal quality of the second SS block. The UE randomly selects a first RA preamble and a first resource from the first configuration, and transmits the first preamble via the first resource. The UE transmits the first preamble repeatedly for a first number of times. For each of the number of times, the UE transmit the first preamble via the first resource or a second resource. The second resource may be selected from the first configuration A RAR timer starts after a first time interval from that the UE transmits the first RA preamble for the first time or for the last time. The UE tries to receive a RAR message including the first RA preamble. If the UE does not receive the RAR message before the RAR timer expires, the UE obtains that it fails to receive the RAR message. If the UE successfully receives the RAR message before the RAR timer expires, the UE transmits a "msg3" message including a UE ID to the gNB via a third resource specified in the RAR message. A contention resolution timer starts after a second time interval from an end of the transmission of the "msg3" message. The UE tries to receive a "msg4" message including the UE ID. If the UE does not receive the "msg4" message before the contention resolution timer expires, the UE obtains that that it fails to receive the "msg4" message.

The UE obtains that the first signal quality of the first SS block is lower than the second signal quality of the second SS block, when the UE obtains that it fails to receive the RAR message or the "msg4" message. The UE selects the second configuration. The UE randomly selects a second RA preamble and a fourth resource from the second configuration, and transmits the second preamble via the fourth resource. The procedure of transmitting the second RA preamble can be referred to the procedure of transmitting the first RA preamble described above.

The "obtain" described above may be replaced by "select", "compute" or "calculate". The "according to"

described above may be replaced by "in" or "on". The "of" described above may be replaced by "associated with" or "corresponding to". The "via" described above may be replaced by "on".

Those skilled in the art should readily make combinations, modifications and/or alterations on the abovementioned steps, description and examples. Some steps described above may not be necessary for realizing the present invention. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program codes 214.

To sum up, the present invention provides a method and a communication device for handing a RA procedure. A UE may select a configuration of a SS block of a BS (i.e., a beam of the BS), when the UE fails to receive a RAR message or a contention resolution message from the BS. Thus, the problem of handling the RA procedure is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of performing a random access (RA) procedure, comprising:
   at least one storage device; and
   at least one processing circuit, coupled to the at least one storage device, wherein the at least one storage device stores, and the at least one processing circuit is configured to execute instructions of:
   receiving a first configuration of a first synchronization signal (SS) block of a base station (BS) and a second configuration of a second SS block of the BS;
   obtaining a first result indicating that a first signal quality of the first SS block is higher than a second signal quality of the second SS block;
   selecting the first configuration according to the first result;
   obtaining a second result indicating that the first signal quality is lower than the second signal quality, when the communication device fails to receive at least one message from the BS;
   selecting the second configuration according to the second result; and
   obtaining that the communication device fails to receive the at least one message from the BS, when the communication device does not receive the at least one message from the BS before a timer expires, wherein the timer is a contention resolution timer.

2. The communication device of claim 1, wherein instructions further comprise:
   selecting a first RA preamble and a first resource from the first configuration; and
   transmitting the first RA preamble to the BS via the first resource.

3. The communication device of claim 2, wherein the instructions further comprise:
   transmitting the first RA preamble to the BS for a first number of times.

4. The communication device of claim 3, wherein the instructions further comprise:
   transmitting the first RA preamble to the BS via the first resource or a second resource in each of the first number of times, wherein the second resource is selected from the first configuration.

5. The communication device of claim 3, wherein the first number of times is the number of a plurality of SS blocks of the BS.

6. The communication device of claim 1, wherein the timer starts after a time interval from that the communication device transmits the first RA preamble to the BS.

7. The communication device of claim 1, wherein the timer starts after a time interval from that the communication device transmits a "msg3" message comprising a user equipment (UE) identity (ID) of the communication device to the BS.

8. The communication device of claim 1, wherein the timer is a RA response (RAR) timer.

9. The communication device of claim 1, wherein the at least one message is a RAR message comprising the first RA preamble, or is a contention resolution message comprising a UE ID of the communication device.

10. The communication device of claim 1, wherein the instructions further comprise:
    selecting a second RA preamble and a third resource from the second configuration;
    transmitting the second RA preamble to the BS via the third resource; and
    transmitting the second RA preamble to the BS for a second number of times.

11. The communication device of claim 10, wherein the second number of times is the number of a plurality of SS blocks of the BS.

12. The communication device of claim 10, wherein the communication device selects the second RA preamble and the third resource from the second configuration, if the first signal quality and the second signal quality are higher than a threshold and the first signal quality is lower than the second signal quality minus an offset.

13. The communication device of claim 12, wherein the threshold is broadcasted by the BS, when the communication device is in a radio resource control (RRC) idle mode, a RRC connected mode or a RRC inactive mode.

14. The communication device of claim 12, wherein the threshold is transmitted by the BS in a RRC message, when the communication device is in a RRC connected mode.

15. The communication device of claim 1, wherein the first signal quality or the second signal quality comprises a reference signal receiving power (RSRP) of a demodulation reference signal (DMRS) for a physical broadcast channel (PBCH).

16. The communication device of claim 1, wherein the first signal quality comprises a RSRP of a primary synchronization signal (PSS) or a secondary synchronization signal (SSS) in the first SS block.

* * * * *